US012613957B2

(12) United States Patent
Dabhi et al.

(10) Patent No.: US 12,613,957 B2
(45) Date of Patent: Apr. 28, 2026

(54) METHOD OF PREVENTING CAPTURE OF AN AI MODULE AND AN AI SYSTEM THEREOF

(71) Applicants: Robert Bosch GmbH, Stuttgart (DE); Robert Bosch Engineering and Business Solutions Private Limited, Bangalore (IN)

(72) Inventors: Shrey Arvind Dabhi, Gujarat (IN); Mayurbhai Thesia Yash, Gujarat (IN); Manojkumar Somabhai Parmar, Gujarat (IN)

(73) Assignees: Robert Bosch GmbH, Stuttgart (DE); Bosch Global Software Technologies Private Limited, Karnataka (IN)

( * ) Notice: Subject to any disclaimer, the term of this patent is extended or adjusted under 35 U.S.C. 154(b) by 61 days.

(21) Appl. No.: 18/692,145

(22) PCT Filed: Sep. 30, 2021

(86) PCT No.: PCT/IB2021/058989
§ 371 (c)(1),
(2) Date: Mar. 14, 2024

(87) PCT Pub. No.: WO2023/052819
PCT Pub. Date: Apr. 6, 2023

(65) Prior Publication Data
US 2025/0139241 A1 May 1, 2025

(51) Int. Cl.
*G06F 21/55* (2013.01)

(52) U.S. Cl.
CPC ...... *G06F 21/554* (2013.01); *G06F 2221/032* (2013.01)

(58) Field of Classification Search
CPC .......................... G06F 21/554; G06F 2221/032
(Continued)

(56) References Cited

U.S. PATENT DOCUMENTS

2019/0050564 A1    2/2019  Pogorelik et al.
2019/0095629 A1    3/2019  Lee et al.
(Continued)

FOREIGN PATENT DOCUMENTS

JP       WO2019/181099 A1      9/2019

OTHER PUBLICATIONS

International Search Report corresponding to PCT Application No. PCT/IB2021/058989, mailed Dec. 22, 2021 (3 pages).

*Primary Examiner* — Brandon Hoffman
(74) *Attorney, Agent, or Firm* — Maginot, Moore & Beck LLP

(57) ABSTRACT

An AI system and a method to prevent capture of an AI module in an AI system are disclosed. The AI system includes at least: an input interface to receive input data from at least one user; a blocker module to detect validity to the received input data and to generate output data corresponding to invalid data being received as input data using a class swapping technique; a data set module to store valid input data sets; an AI module to process the input data and generate output data corresponding to the input data; a blocker notification module to transmit a notification to the owner of the AI system on detecting an invalid input data and an output interface to send the generated output data to the at least one user.

8 Claims, 3 Drawing Sheets

(58) Field of Classification Search
USPC ........................................................ 726/23
See application file for complete search history.

(56) References Cited

U.S. PATENT DOCUMENTS

| | | | |
|---|---|---|---|
| 2019/0311277 A1* | 10/2019 | Kursun | .................... G06N 3/08 |
| 2020/0143045 A1 | 5/2020 | Joye et al. | |
| 2020/0234184 A1* | 7/2020 | Kesarwani | ........ G06F 16/90335 |

* cited by examiner

METHOD OF PREVENTING CAPTURE OF AN AI MODULE AND AN AI SYSTEM THEREOF

This application is a 35 U.S.C. § 371 National Stage Application of PCT/IB2021/058989, filed on Sep. 30, 2021, the disclosure of which is incorporated herein by reference in its entirety.

The following specification describes and ascertains the nature of this disclosure and the manner in which it is to be performed.

The present disclosure relates to a method of training a module in an AI system and a method of preventing capture of an AI module in the AI system.

BACKGROUND

Now days, most of the data processing and decision making systems are implemented using artificial intelligence modules. The artificial intelligence modules use different techniques like machine learning, neural networks, deep learning etc.

Most of the AI based systems, receive large amounts of data and process the data to train AI models. Trained AI models generate output based on the use cases requested by the user. Typically the AI systems are used in the fields of computer vision, speech recognition, natural language processing, audio recognition, healthcare, autonomous driving, manufacturing, robotics etc. where they process data to generate required output based on certain rules/intelligence acquired through training.

To process the inputs, the AI systems use various models/algorithms which are trained using the training data. Once the AI system is trained using the training data, the AI systems use the models to analyze the real time data and generate appropriate result. The models may be fine-tuned in real-time based on the results.

The models in the AI systems form the core of the system. Lots of effort, resources (tangible and intangible), and knowledge goes into developing these models.

It is possible that some adversary may try to capture/copy/extract the model from AI systems. The adversary may use different techniques to capture the model from the AI systems. One of the simple techniques used by the adversaries is where the adversary sends different queries to the AI system iteratively, using its own test data. The test data may be designed in a way to extract internal information about the working of the models in the AI system. The adversary uses the generated results to train its own models. By doing these steps iteratively, it is possible to capture the internals of the model and a parallel model can be built using similar logic. This will cause hardships to the original developer of the AI systems. The hardships may be in the form of business disadvantages, loss of confidential information, loss of lead time spent in development, loss of intellectual properties, loss of future revenues etc.

There are methods known in the prior arts to identify such attacks by the adversaries and to protect the models used in the AI system. The prior art US 2019/0095629 A1 discloses one such method.

The method disclosed in above prior art receives the inputs, the input data is processed by applying a trained model to the input data to generate an output vector having values for each of the plurality of pre-defined classes. A query engine modifies the output vector by inserting a query in a function associated with generating the output vector, to thereby generate a modified output vector. The modified output vector is then output. The query engine modifies one or more values to disguise the trained configuration of the trained model logic while maintaining accuracy of classification of the input data.

BRIEF DESCRIPTION OF THE DRAWINGS

Different modes of the disclosure are disclosed in detail in the description and illustrated in the accompanying drawing.

DETAILED DESCRIPTION

Figure 1:
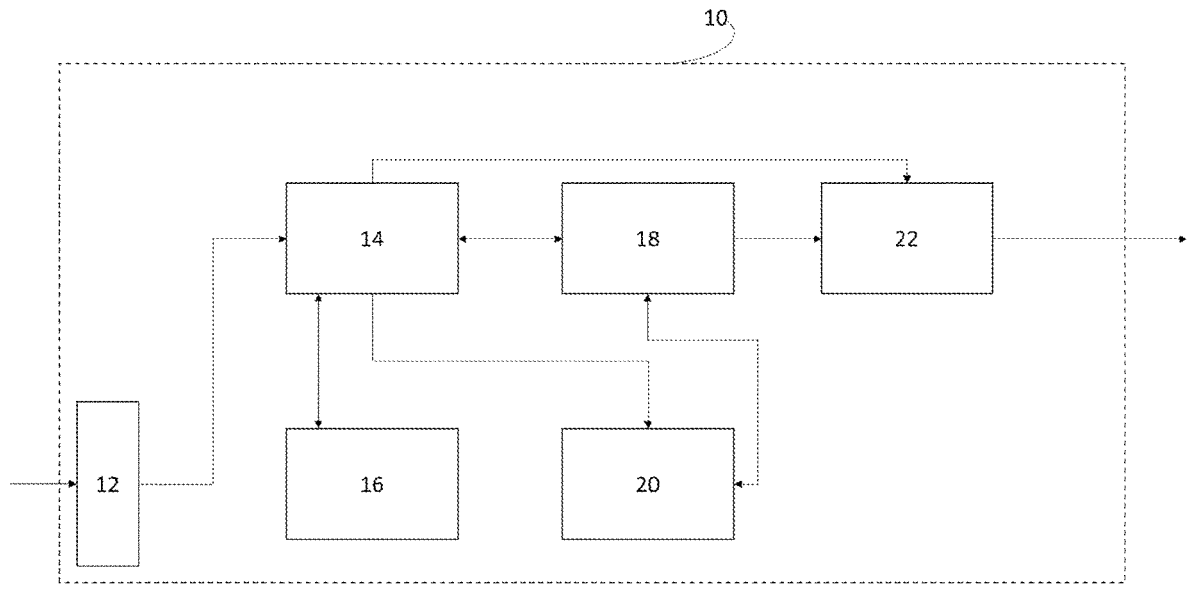
FIG. 1 illustrates a block diagram representative of the different building blocks of an AI system in accordance with this disclosure.

It is important to understand some aspects of artificial intelligence (AI) technology and artificial intelligence (AI) based systems or artificial intelligence (AI) system. This disclosure covers two aspects of AI systems. This disclosure covers an aspect related to the prevention of capturing of the AI module in an AI system.

Some important aspects of the AI technology and AI systems can be explained as follows. Depending on the architecture of the implementation, the AI system may include many components. One such component is an AI module. An AI module with reference to this disclosure can be explained as a component, which runs at least one model. A model can be defined as reference or an inference set of data, which is used in different forms of correlation matrices. Using these models and the data from these models, correlations can be established, between different types of data to arrive at some logical understanding of the data. A person skilled in the art would be aware of the different types of AI models such as linear regression, naïve bayes classifier, support vector machine, neural networks and the like. It must be understood that this disclosure is not specific to the type of AI model being executed in the AI module and can be applied to any AI module irrespective of the AI model being executed. A person skilled in the art will also appreciate that the AI module may be implemented as a set of software instructions, combination of software and hardware or any combination of the same.

Some of the typical tasks performed by AI systems are classification, clustering, regression etc. Majority of classification tasks depend upon labeled datasets; that is, the data sets are labelled manually in order for a neural network to learn the correlation between labels and data. This is known as supervised learning. Some of the typical applications of classifications are: face recognition, object identification, gesture recognition, voice recognition etc. Clustering or grouping is the detection of similarities in the inputs. The cluster learning techniques do not require labels to detect similarities. Learning without labels is called unsupervised learning. Unlabeled data is the majority of data in the world. One law of machine learning is: the more data an algorithm can train on, the more accurate it will be. Therefore, unsupervised learning models/algorithms has the potential to produce accurate models as training dataset size grows.

As the AI module forms the core of the AI system, the module needs to be protected against attacks. Attackers attempt to attack the model within the AI module and steal information from the AI module. The attack is initiated through an attack vector. In the computing technology a vector may be defined as a method in which a malicious code/virus data uses to propagate itself such as to infect a computer, a computer system or a computer network. Similarly an attack vector is defined as a path or means by which a hacker can gain access to a computer or a network in order to deliver a payload or a malicious outcome. A model stealing attack uses a kind of attack vector that can make a digital twin/replica/copy of an AI module. This attack has been demonstrated in different research papers, where the model was captured/copied/extracted to build a substitute model with similar performance.

The attacker typically generates random queries of the size and shape of the input specifications and starts querying the model with these arbitrary queries. This querying produces input-output pairs for random queries and generates a secondary dataset that is inferred from the pre-trained model. The attacker then take this I/O pairs and trains the new model from the scratch using this secondary dataset. This is black box model attack vector where no prior knowledge of original model is required. As the prior information regarding model is available and increasing, attacker moves towards more intelligent attacks. The attacker chooses relevant dataset at his disposal to extract model more efficiently. This is domain intelligence model based attack vector. With these approaches, it is possible to demonstrate model stealing attack across different models and datasets.

As mentioned above an attacker is directly able to send a random query to a model with the expectation of some out. One object of the claimed concept in this disclosure is not to allow the attacker/user any access to the AI model in the AI module.

It must be understood that the disclosure in particular discloses a methodology to prevent capturing of an AI module in an AI system. While these methodologies describes only a series of steps to accomplish the objectives, these methodologies are implemented in AI system, which may be a combination of hardware, software and a combination thereof.

Figure 2:
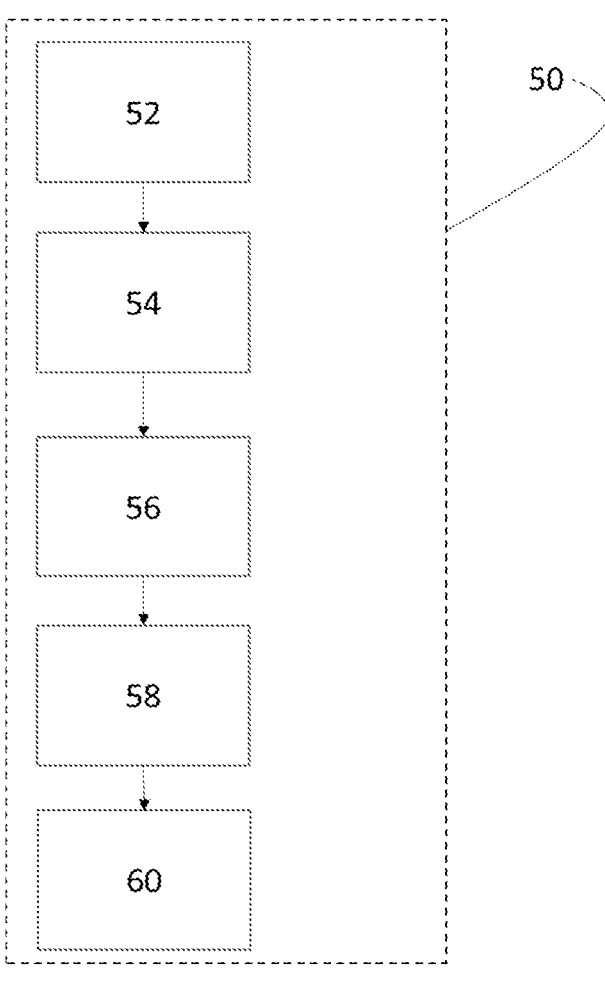
FIG. 2 illustrates a block diagram representative of the method used for preventing capture of an AI module in an AI system in accordance with this disclosure.
Figure 3:
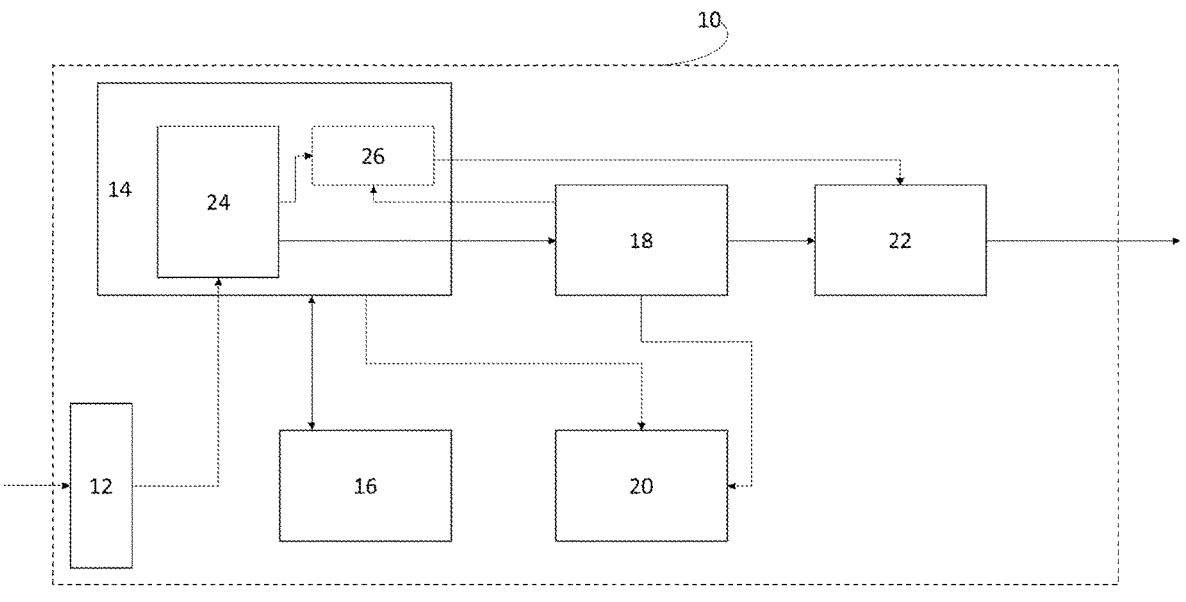
FIG. 3 illustrates a block diagram representative of additional details of the different building blocks of the AI system in accordance with this disclosure.

FIG. 1, FIG. 2 and FIG. 3 illustrate a block diagrams representative of the different building blocks of an AI system and a method to prevent capturing of an AI module in an AI system in accordance with this disclosure. It must be understood that each of the building blocks of the AI system may be implemented in different architectural frameworks depending on the applications. In one embodiment of the architectural framework all the building block of the AI system are implemented in hardware i.e. each building block may be hardcoded onto a microprocessor chip. This is particularly possible when the building blocks are physically distributed over a network, where each building block is on individual computer system across the network. In another embodiment of the architectural framework of the AI system are implemented as a combination of hardware and software i.e. some building blocks are hardcoded onto a microprocessor chip while other building block are implemented in a software which may either reside in a microprocessor chip or on the cloud. Each building block of the AI system in one embodiment would have a individual processor and a memory FIG. 1 illustrates a block diagram representative of the different building blocks of an AI system in accordance with this disclosure. An AI system 10 comprising at least: an input interface 12 to receive input data from at least one user; a blocker module 14 to detect validity to the received input data and to generate output data corresponding to invalid data being received as input data and output data from AI module 18 which corresponds to said invalid data sent to said AI module 18; a data set module 16 to store valid input data sets; an AI module 18 to process said input data and generate output data corresponding to the input data; a blocker notification module 20 to transmit a notification to the owner of the AI system 10 on detecting an invalid input data and an output interface 22 to send the generated output data to said at least one user.

As seen in FIG. 3, the blocker module 14 comprises an attack detection module 24 and an output generation module 26. The attack detection module 24 of the AI system 10 is in communication with said data set module 16 of the AI system 10. The output generation module 26 generates output data corresponding to the input data in a manner such that output data is generated using a class swapping technique if receive input data is detected as invalid in the blocker module 14.

The input interface 12 may be a keyboard, a touch screen, images, videos, suitable stimulus etc. It is also possible that the inputs may come over a bus or wirelessly or through any other communication. The output interface 22 may comprise a display or a bus. The output may be displayed on a display or sent through the bus which can be read by other devices.

FIG. 2 illustrates a block diagram representative of the method used for preventing capture of an AI module in an AI system in accordance with this disclosure. The method 50 comprises the following steps: receiving 52 input data from at least one user through an input interface 12; detecting 54 input data as an invalid input data in a blocker module 14 in the AI system 10; transmitting (56) input data from the blocker module (14) to an AI module (18) in the AI system; processing 58 the input data in the blocker module 14 in a manner such that the output data from the blocker module 14 is an output data generated by a class swapping technique of the intended output if the input data is detected as an invalid input data and sending 60 to the at least one user the output data generated by swapping class of the intended output through the output interface 22.

Based on the historic and legacy data information about the invalid data input are collected over a period of time and stored in the data set module 16. Invalid input data is defined as an input data which does not relate to the data set stored in the data set module 16 of the AI system 10. The invalid input data is an attack input data. The data set module 16 of this disclosure also stores output information which in some case may have some correlation to the input data and in other case may not have correlation to the input data. The data set module 16 communicates with the blocker module 14. The data set module 16 is implemented in the form of a storage medium. The input data that is provided to the AI system 10 may be a combination of inputs, which would either trigger an expected output or an unexpected output from the AI module 18 of the AI system. The concept of this disclosure is that an input which is initially detected as an invalid input is sent to the AI module 18 to provide a distribution of output data. The blocker module 14 itself generates/chooses an output using a class swapping technique.

During runtime and during the working of the AI system 10 in accordance with this disclosure, the AI system 10 may receive input data from a user through an input interface 12. The input data may consist of valid input data or invalid input data or a combination thereof. With reference to this disclosure valid input data may be defined as input data which is related to the data set module 16. Invalid input data may be defined as input data which is not related to the data set module 16 and hence is unknown to the AI system 10. The input data is then transmitted to the blocker module 14. As already mentioned the blocker module 14 comprises an attack detection module 24 and an output generation module 26. The input data transmitted from the input interface 12 is received by the attack detection module 24. Since the attack detection module 24 communicates with the data set module 16, based on the data that is present in the data set module, the attack detection module 24 is able to detect if the input data is an invalid input data.

Once the input data is detected as invalid input data, the information is sent to the output generation module 26. As mentioned earlier, the output of the AI module 18 is also sent to the blocker module 14. In particular the output of the AI module 18 is sent to the output generation module 26. The output generation module then generates an output using class swapping technique. A first methodology of the class swapping technique involves a randomization based class swapping. A second methodology of the class swapping technique involves a rule based logical class swapping. Once the input data is detected as an invalid input data the blocker module 14 sends this information to the blocker notification module 20. Irrespective of the first or the second methodology, the since the output generation module 26 receives output data from said AI module 18, both the class swapping technique ensure that the output data from the output generation module 26 does not belong to the same class as the output from the AI module 18. The blocker notification module 20 transmits a notification of the invalid input data to the owner of the AI system 10. This information is not sent to the user, the advantage of this is that the user will not receive any information that the AI system 10 in accordance with this disclosure is now able to ascertain that the AI system 10 is under attack.

In accordance with a first methodology of the class swapping technique, the output data is generated by randomly swapping the class of the output data. Random swapping of the class can be envisaged in two way, a first way in which the generated output data is completely random and has no correlation to the input data and a second way in which the generated output data in randomly selected but has some correlation to the input data. The output data that is generated is then sent to the user through the output interface 22. Thus when the user receives the output data obtained by random class swapping technique based on the random class swapping it would not be possible for the user to determine if the attack has been detected.

In accordance with a second methodology of the class swapping technique, the output data is generated by a rule based logical class swapping of the output data. A rule based logical class swapping can be implemented such that the class swapping is done in a pre-defined manner. The pre-defined manner being such that the class of the generated output is some how correlated to the class of the actual output that is expected by the user attacking the AI system. The output generated by the rule based logical class swapping technique is sent to the user through the output interface 22. The advantage of the using a rule based logical class swapping technique is that, since the class of the output and the class of the invalid input are correlated the user would not be able to determine if the attack is being detected by the AI system.

Thus the advantage of this type of a method and AI system is that a user who sends an invalid input would still receive an output from the AI system 10. However, using the output data from the AI system 10 it would be very difficult to reconstruct/recreate the AI module 18. Hence stealing the AI model in the AI module would be difficult or minimized. Beyond the possibility of providing an output that is generated by the blocker module 14 it is also possible to flag the user using the AI system in accordance with this disclosure. Flagging of the user would be based on the user profile. The following information may be used to store information regarding the user: types of the bad data/attack vectors provided by the user, number of times the user input bad data/attack vector, the time of the day when bad data/attack vector was inputted to the AI system, the physical location of the user, the digital location of user, the demographic information of the user and the like. In addition the user profile may be used to determine whether the user is habitual attacker or was it one time attack or was it only incidental attack etc. Depending upon the user profile, the steps for unlocking of the system may be determined. If it was first time attacker, the user may be locked out temporarily. If the attacker is habitual attacker then a stricter locking steps may be suggested.

It must be understood that the AI system as disclosed through the representation shown in FIG. 1, FIG. 2 and FIG. 3 are only illustrative of the AI system and method which is the focus of this disclosure and do not limit the scope of the disclosure from the perspective of the location and presence of the various other building blocks of the AI system 10. It is envisaged the position of the building blocks of the AI system can be changed and more building blocks can be added and these changes are within the scope of this disclosure. The scope of this disclosure is only limited from the perspective of the method steps as disclosed. The implementation of the each of the building blocks of the AI system 10 can be done in any form which may be hardware, software or a combination of hardware and software.

We claim:

1. A method to prevent capture of an AI module in an AI system, comprising:
   receiving input data from at least one user through an input interface;
   detecting the input data as invalid input data in a blocker module in the AI system;
   transmitting the input data from the blocker module to the AI module in the AI system;
   generating output data based on the input data using the AI module;
   processing the input data and the output data from the AI module in the blocker module to generate output data from the blocker module, the output data from the blocker module obtained by a class swapping technique of the output data from the AI module when the input data is detected as the invalid input data; and
   sending to the at least one user the output data from the blocker module through an output interface of the AI system,
   wherein the input data is detected as the invalid input data when the input data does not relate to a data set stored in a data set module of the AI system.

2. The method as claimed in claim 1, wherein the invalid input data is an attack input data.

3. The method as claimed in claim 1, wherein the class swapping technique involves a randomization based class swapping.

4. The method as claimed in claim 1, wherein the class swapping technique involves a rule based logical class swapping.

5. The method as claimed in claim 1, further comprising:

transmitting a notification of the invalid input data to an owner of the AI system, using a blocker notification module.

6. An AI system, comprising:

an input interface configured to receive input data from at least one user;

a blocker module configured (i) to detect valid input data from the received input data and invalid input data from the received input data, and (ii) to generate output data when the invalid input data is detected;

a data set module configured to store valid input data sets;

an AI module configured to process the received input data and generate output data corresponding to the received input data;

a blocker notification module configured to transmit a notification to an owner of the AI system when the blocker module detects the invalid input data; and an output interface configured to send the generated output data to the at least one user, wherein the output data from the blocker module is obtained by a class swapping technique of the output data from the AI module, wherein the blocker module detects the received input data as the invalid input data when the received input data does not relate to a data set stored in a data set module of the AI system, and wherein the output interface (i) sends the output data from the AI module to the at least one user when the received input data is detected as the valid input data, and (ii) sends the output data from the blocker module to the at least one user when the received input data is detected as the invalid input data.

7. The AI system as claimed in claim 6, wherein the blocker module comprises an attack detection module and an output generation module.

8. The AI system as claimed in claim 7, wherein the attack detection module of the AI system is in communication with the data set module of the AI system.

* * * * *